Jan. 7, 1936.   W. L. SORENSON   2,027,069
ARTIFICIAL BAIT
Filed July 3, 1934
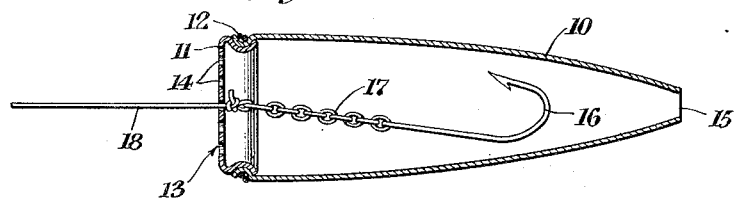
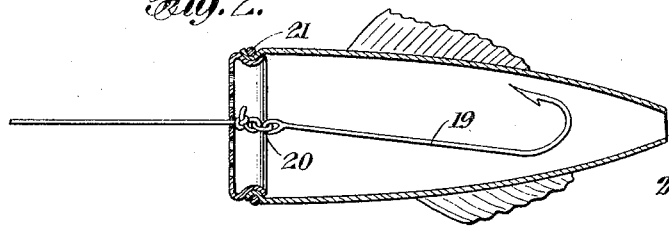
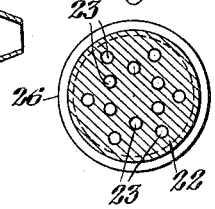
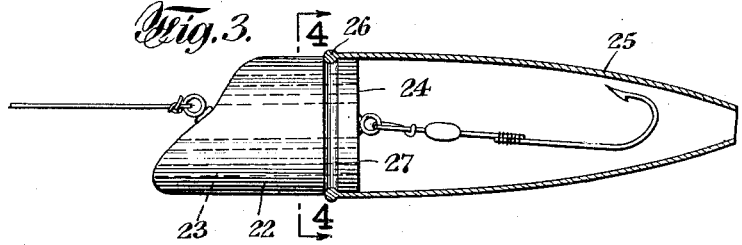
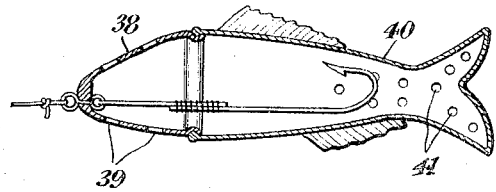
INVENTOR
Wendell L. Sorenson
BY
ATTORNEY Patented Jan. 7, 1936

2,027,069

UNITED STATES PATENT OFFICE 2,027,069

ARTIFICIAL BAIT

Wendell L. Sorenson, Brooklyn, N. Y.

Application July 3, 1934, Serial No. 733,539

4 Claims. (Cl. 43—46)

This invention relates to artificial bait for fishing tackle, particularly of the flexible type for simulating the body movement of fish in motion.

Most bait of this class are made of non-porous soft rubber, with the hook attached to the body and exposed at the outside thereof. Devices so constructed are not only insufficiently flexible to produce the desired quivering movement but are also generally subject to the danger of being snagged, inasmuch as a lure of the type having an exposed hook is frequently fouled by weeds. I have hence conceived this invention for the main purpose of overcoming these objections, and I accomplish my object, in the preferred form of this invention, by the use of a suitably mounted envelope of flexible material, such as rubber, containing therein a loosely anchored concealed hook. The envelope is inflated with the water flowing therethrough through suitable inlet and outlet openings, thereby not only producing a slight surface movement of the envelope and permitting a flexing and wiggling thereof during the movement of the bait through the water, but also serving to keep the hook afloat and in the proper position. The construction is such as to permit the forcing out of water through said openings upon a squeezing of the envelope by a fish lured to the bait, the hook puncturing the envelope to spear the fish.

Other objects, features and advantages will appear from the drawing, and the description hereinafter given.

Referring to the drawing,

Figure 1 is a longitudinal sectional view of a preferred form of my invention showing a flexible envelope secured to the head portion of the bait by means of a cord, a short hook being loosely anchored by a chain.

Figure 2 shows a construction similar to that of Figure 1, the envelope containing thereon fins and being secured in place by a split ring,—the hook being relatively longer and pivotally anchored.

Figure 3 illustrates a form of my invention containing a solid head portion upon which is yieldably mounted a rubber envelope.

Figure 4 is a vertical section through the head member of Figure 3.

Figure 5 is another form of my invention showing a hollow conoidal head portion upon which is mounted a fish-shaped envelope.

In the drawing, a flexible envelope 10 made either of cloth, rubber or other similar material is secured to the head portion 11 by means of the cord 12, the said head portion being of cylindrical shape and containing an annular groove therein with the walls of which the terminal portion of the envelope is engageable. The head portion 11 contains a front wall 13 which has therein a plurality of apertures 14, and the envelope has at the rear extremity thereof an opening 15 the cross sectional area of which is preferably smaller than the aggregate area of the said apertures 14. Anchored to the head portion 11 is the hook 16, the chain 17 connecting a terminal of the hook to the line 18.

In the operation of this device, water enters through the said apertures 14, filling up the entire envelope 10, and leaving through the opening 15,—the envelope being at all times fully inflated due to the fact that the terminal portion thereof is restricted in area, the said outlet opening 15 being, as stated, smaller than the inlet openings 14. Due to the constant rearward flow of water through the envelope, the chain 17 is generally kept quite taut so that the hook is practically at all times in its rearmost position as shown. The movement of the bait through the water produces a flexing or bending of the body portion of the envelope in such a way as to simulate the natural wiggle of a fish,— the water core of the bait being sufficiently bendable to permit such an effect; and the constant flow of water through this device causes a slight surface movement of the lateral side of the envelope to enhance this simulation. Upon a bending or flexing of the envelope, as stated, the hook 16 will be able to retain its relative position with respect to the envelope, due to the fact that the chain will permit a movement of the hook in all directions.

Instead of the hook as shown in Figure 1, a longer hook 19, shown in Figure 2, can be employed together with a simple pivotal arrangement or a single link 20. Where the envelope itself is inelastic, a cord such as is identified by the numeral 12 of Figure 1 can be employed, or instead, a split ring 21 as shown in Figure 2. It will also be noted by referring to Figure 2 that the envelope need not necessarily be of smooth contour, as it can have thereon fins similar to that of a fish.

Another modification is shown in Figure 3 which illustrates a solid body portion 22 containing therein a plurality of openings 23 extending rearwardly to the back face 24 of said head portion. Mounted upon the head portion is a rubber envelope 25, the terminal portion 26 of which has an elastic band which snaps into place over the grooved portion 27 of the said head portion,—thereby eliminating the use of a cord or other securing means.

Still another modification is illustrated in Figure 5 which shows a hollow head portion 38 of conoidal shape and containing a plurality of perforations 39. Suitably secured to this head portion is the fish-shaped flexible envelope 40 containing fins thereon and a plurality of outlet openings 41 at the rear portion thereof. This design more nearly resembles the actual form of a fish and still permits the coursing through of water as in the other forms of my invention,—it being understood that it is preferred to have the aggregate area of the holes 41 less than that of the perforations 39 so as to keep the envelope inflated at all times.

In all the forms hereinbefore described, the hook was in each case completely concealed and contained within the body of the bait, thereby obviating at all times the danger of snagging weeds which has always been the bane of fishermen. Despite the fact however that the hook is concealed, the bait is at all times operatively effective in view of the fact that upon a squeezing together of the lateral surface of the bait, a quantity of water will be forced out through the inlet and outlet openings of the envelope forming part of my invention. A continued squeezing, such as occurs when the fish strikes, will cause a compression of the envelope, and a consequent spearing of the fish, as previously described.

This invention is not limited to the particular forms herein described, as other modifications and changes can be made therein in accordance with the appended claims.

What I claim is:

1. An artificial bait comprising a hollow cylindrical head portion containing a perforated front wall, the lateral wall thereof having an annular grooved portion thereon, a flexible, open-ended laterally enclosed envelope, the forward portion thereof being in engagement with said grooved portion, means for securing said terminal portion to said head portion, a hook positioned within said envelope, and a chain anchoring said hook to said front wall.

2. An artificial bait comprising a solid head portion containing through passages extending rearwardly to the back surface thereof and having an annular grooved portion at the outer lateral surface thereof, a flexible, open-ended laterally enclosed envelope of substantially conoidal shape, the larger terminal portion thereof being in engagement with said grooved portion, means for securing said terminal portion to said grooved portion, and a hook positioned within said envelope and loosely anchored to the back surface of the head portion.

3. An artificial bait comprising a hollow substantially conoidal head portion containing a plurality of perforations therein, a flexible, fish-shaped envelope suitably secured to said head portion, the tail portion of said envelope containing a plurality of perforations therein of smaller aggregate area than that of the first-mentioned perforations, and a hook loosely anchored to said head portion.

4. An artificial bait comprising a suitably mounted flexible laterally enclosed envelope forming a hollow and substantially empty and unobstructed chamber adapted to contain water therein, inlet and outlet passages for water at the front and rear portions of the chamber, the total inlet area being greater than the outlet area, and a loosely mounted hook completely contained within said envelope.

WENDELL L. SORENSON.